: US 10,108,578 B2
(45) Date of Patent: Oct. 23, 2018

(12) United States Patent
Ayyagari et al.

(54) SINGLE WIRE COMMUNICATIONS INTERFACE AND PROTOCOL

(71) Applicant: Texas Instruments Incorporated, Dallas, TX (US)

(72) Inventors: Ravishankar S. Ayyagari, Bangalore (IN); Supreet Joshi, Bangalore (IN); Bharath Patil, Bangalore (IN); Madhav Tejaswi Boddhapu, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 682 days.

(21) Appl. No.: 14/482,474

(22) Filed: Sep. 10, 2014

(65) Prior Publication Data

US 2015/0074306 A1    Mar. 12, 2015

(30) Foreign Application Priority Data

Sep. 11, 2013  (IN) .......................... 4061/CHE/2013

(51) Int. Cl.
G06F 13/00     (2006.01)
G06F 13/42     (2006.01)
G06F 13/40     (2006.01)

(52) U.S. Cl.
CPC ...... *G06F 13/4295* (2013.01); *G06F 13/4072* (2013.01)

(58) Field of Classification Search
CPC .. G06F 13/385; G06F 13/362; G06F 13/4282; G05B 2219/2231; G05B 2219/2237; G05B 2219/40399; G05B 2219/1215

USPC .................. 710/110, 305–306, 100
See application file for complete search history.

(56) References Cited

U.S. PATENT DOCUMENTS

| 4,979,185 A * | 12/1990 | Bryans ................ H04L 7/041 341/95 |
| 2005/0269580 A1* | 12/2005 | D'Angelo .......... H05B 33/0818 257/88 |
| 2009/0052315 A1* | 2/2009 | Kollner et al. ....... H04L 1/1692 370/212 |
| 2012/0239841 A1 | 9/2012 | Trifonov et al. |
| 2013/0197920 A1* | 8/2013 | Lesso .................. H04L 25/4902 704/500 |

* cited by examiner

*Primary Examiner* — Tim T Vo
*Assistant Examiner* — Kim T. Huynh
(74) *Attorney, Agent, or Firm* — Lawrence J. Bassuk; Charles A. Brill; Frank D. Cimino

(57) ABSTRACT

In a single wire communications interface embodiment, a single wire is coupled between a master device and at least one slave device, the master device configured for transmitting data words as serial data to and for receiving data words as serial data from the at least one slave device, and the at least one slave device configured for transmitting data words as serial data to and receiving data words as serial data from the master device; wherein prior to transmission of any data word on the single wire by one of the master device and the slave device, a sync pulse is first transmitted on the single wire. Integrated circuit embodiments for implementing the single wire communications interface, and method embodiments incorporating the single wire communications interface are disclosed. Additional embodiments are disclosed.

18 Claims, 6 Drawing Sheets

SINGLE WIRE COMMUNICATIONS INTERFACE AND PROTOCOL

RELATED APPLICATIONS

This patent application claims priority to India Provisional Patent Application No. 4061/CHE/2013, filed Sep. 11, 2013, entitled "A Simple, Fast and Robust Communication Interface Using a Single Wire Protocol", which is hereby incorporated by reference herein in its entirety.

TECHNICAL FIELD

The embodiments relate generally to the use of communication busses between electronic devices. Applications of communications busses include making data transfers, command transfers, observation of internal states of devices, debug of software, firmware and stored programs, and test. In the prototyping, test and debugging context, the communications interface for debug represents extra wires and pins that are typically not part of the finished product, and are not used by the end consumer or purchaser, and so a communications interface that has minimal requirements for extra pins, wires, devices and board area is needed. The debug communications interfaces are used to confirm operation of hardware, firmware and software. In an example application the debug communications interfaces can be used for confirming the operation of new integrated circuits, or for validating the operation of new systems incorporating mature integrated circuits. The embodiments advantageously provide a robust and improved communications interface and protocols for reliably exchanging data between devices with a minimum demand on system resources by using only a single wire.

BACKGROUND

Communications interfaces for integrated circuit devices are increasingly used to perform test and debug for systems. Often there is a need to control and observe the internal state of integrated circuit devices. This observation feature is needed for debugging software and firmware used to implement a system. However, in a typical case these interfaces are not used in the finished product. The resources required for the debug interface take away from resources that could be otherwise used for additional product features. As a result it is extremely undesirable to dedicate substantial board space and area, wires and interface pins, to the communications interface used for debugging the system. While the communications interface is necessary to validate the system, the impact on system resources must be minimized.

Many test and debug communications interfaces have been designed and currently are in use. The JTAG interface promulgated by the Joint Test Action Group, covered by the IEEE 1149.1 specification entitled "Standard Test Port and Boundary Scan Architecture", the Inter-Integrated Circuit (I2C) bus interface, the SMBus interface, the SPI bus interface, are all examples of various prior known solutions. Each of these communications protocols requires multiple wires and some use a dedicated clock or strobe line. These multiple wire interfaces also require multiple routing channels that require valuable system board space and routing space within the integrated circuits or circuit boards. Further, when multiple wire interfaces are used, there is an increased likelihood of errors or failures due to shorting and crosstalk problems at both the board and device level. Some known prior approach interfaces further require synchronous communications with critical timing, and some may require precise on-board timing circuits, some solutions may require additional precision timing sources such as crystal oscillators. If the interface circuitry inside the integrated circuit is complex, valuable integrated circuit die area is required for the communications interface, integrated circuit die area that is at a premium and which could otherwise be used for providing additional features to the integrated circuit and the corresponding system.

A prior single wire communications interface is described by U.S. patent application Ser. No. 13/049,694, entitled "Serial Interface", published Sep. 20, 2012, which is co-owned with the present application, and which is hereby incorporated in its entirety herein by reference.

Improvements in the communications interface between devices are therefore needed to address the deficiencies and the disadvantages of the known prior approaches. Solutions are needed that have minimum wiring, pin and device area requirements, that are robust, that provide reliable data communications with sufficient speed, that are low in cost, and that are easy to implement and use.

SUMMARY

Aspects of the present application provide a single wire data interface between integrated circuits with improved reliability and robust data transmission. A sync symbol begins each word of data transfer. The use of the sync symbol with each word that is transmitted makes the data transmission reliable and robust, even across variations in devices due to individual circuit device sensitivity to temperature, noise and voltage variations. A method for detecting and recovering from a stuck state on the data bus is provided. A method for detecting and resolving conflicts on the bus further increasing the reliability and the robustness of the interface is provided. A method is provided for a bus master to use a pilot readback sequence to determine validity of the interface link to a slave device, and to select an optimum speed for communications to the slave device. In an aspect of the present application, a single bus master device is coupled to a plurality of slave devices on the single wire interface.

In one aspect of the present application, a single wire communications interface includes a single wire coupled between a master device and at least one slave device, the master device configured for transmitting data words as serial data to and for receiving data words as serial data from the at least one slave device, and the at least one slave device configured for transmitting data words as serial data to and receiving data words as serial data from the master device; wherein prior to transmission of any data word on the single wire by one of the master device and the slave device, a sync pulse is first transmitted on the single wire. In a further aspect of the present application, the single wire communications interface is provided, wherein following each data word transmission, a valid stop bit symbol is transmitted on the single wire by the one of the master device and the slave device that transmitted the data word. In still another arrangement, the single wire communications interface is provided, wherein the sync pulse transmitted prior to the transmission of each data word on the single wire further comprises: a sync start symbol comprising a first predetermined voltage level placed on the single wire for a time duration that defines a bit time period; and a sync valid symbol comprising a second predetermined voltage transmitted on the single wire for a duration of the bit time period. In yet a further aspect of this application, the single wire communications interface includes a bit time period defined by counting a predetermined number of clock cycles for an internal clock in the one of the master device and the slave device, whichever one is transmitting the data word on the single wire.

In still another aspect of the present application, in the single wire communications interface above each of the master device and the at least one slave device further comprise: a transmit data buffer comprising an output driver coupled to pull down the voltage on the single wire to transmit a low voltage level corresponding to a first type of data bit, the output driver configured to let the single wire float to a pull up voltage level higher than the low voltage level to transmit a second type of data bit. In yet another alternative arrangement, the single wire communications interface is provided wherein each of the master device and the at least one slave device further comprise: a receive data buffer coupled to sample the voltage on the single wire and to output a corresponding received data signal; and a counter coupled to count the cycles of an internal clock and coupled to the received data signal, and outputting a count corresponding to the duration of the bit time period. In still a further alternative, the single wire communications interface includes wherein each of the master device and the at least one slave device further comprise: a bus transceiver circuit coupled to the transmit data buffer and the receive data buffer, further comprising: a data transmitter configured to convert parallel data words into serial data words for transmission on the single wire interface and outputting a serial transmit data bit; a data receiver coupled to the received data signal and configured to convert serial received data bits into parallel data words, and outputting received data words; and a bus controller configured to detect a sync pulse symbol on the single wire, and further configured to control the counter to count the number of clock cycles defining a bit time period, and further configured to transmit a sync pulse on the single wire and configured to control the counter and the transmitter to extend a sync start symbol for a number of clock cycles that equals a predetermined bit time period. In yet another aspect of the present application, the single wire communications interface provided above includes wherein the sync start symbol comprises a low voltage corresponding to a ground signal on the single wire interface. In a further alternative arrangement, the single wire communications interface includes wherein the sync valid symbol comprises a pulled up voltage on the single wire interface, greater than the low voltage. In a further aspect of the present application, a plurality of slave devices are coupled to a master device on the single wire communications interface. In yet another alternative, the single wire communications interface described above is provided and further comprising an external pull up device coupled to a positive supply voltage configured to pull the single wire interface to the positive supply voltage.

In another aspect of the present application, an integrated circuit is configured to transmit and receive data on a single wire interface, comprising a single external pin configured to output serial data bits and input serial data bits on the single wire interface; a pull down buffer configured receive transmit serial data and to pull a voltage on the single wire interface to a low level when transmitting a serial data bit of a first type; the pull down buffer configured to allow a voltage on the single wire interface to rise to a pull up voltage provided external to the integrated circuit when transmitting a serial data bit of a second type; a serial data input buffer coupled to the single external pin and receiving serial data bits from the single wire interface, and outputting serial received data; and having an internal bus transceiver circuit further comprising: a receiver coupled to receive the serial received data and configured to convert the received serial data into parallel data words, and outputting the parallel data words; a transmitter coupled to receive parallel data words for transmission on the single wire interface, and configured to convert the parallel data words into serial data words, and coupled to the pull down output buffer for outputting serial data bits for transmission on the single wire interface; a clock input coupled to receive an internal clock signal; a clock counter coupled to the receiver, the transmitter and the clock input, for counting clock cycles; and a bus controller configured to cause the transmitter to transmit a sync pulse on the single wire interface prior to transmitting each data word on the single wire interface; wherein the sync pulse further comprises a sync start symbol that is a low voltage on the single wire interface for a time period that extends for a minimum number of clocks counted by the clock counter, and a sync valid symbol that is a high voltage on the single wire interface that extends for the time period, the time period defining a bit time period.

In a further aspect of the present application, the integrated circuit is provided wherein duration of the bit time period is set to at least a minimum number of clock cycles counted for a clock that has a frequency that is a multiple of a predetermined baud rate. In yet another alternative, the integrated circuit includes wherein the bus controller is further configured to transmit a data word corresponding to a read command, and to transmit data words corresponding to an address indicating a slave device register address and the bus controller is further configured to transmit a sync pulse prior to the transmission of each data word on the single wire interface. In still another aspect of the present application, the integrated circuit is provided wherein following the transmission of the read command and the address indicating the slave device register address, the bus controller is configured to receive a sync pulse from a slave device coupled to the single wire interface, followed by a predetermined number of data words corresponding to data stored in a slave register corresponding to the slave device register address, the receiver receiving a sync pulse prior to receiving each data word on the single wire interface.

In a further aspect of the present application, in the integrated circuit, the bus controller is further configured to transmit a data word corresponding to a pilot readback command, and an address corresponding to a slave device pilot register address, and the bus controller is further configured to transmit a sync pulse prior to the transmission of each data word on the single wire interface; and following the transmission of the read command and the address corresponding to the slave device register address, the bus controller is further configured to receive a sync pulse from a slave device coupled to the single wire interface, followed by a predetermined number of data words corresponding to data stored in a slave pilot register corresponding to the slave device pilot register address, the receiver receiving a sync pulse prior to receiving each data word on the single wire interface, and the bus controller is further configured to compare the predetermined number of data words to an expected pilot register pattern, and the bus controller is configured to change the frequency of the internal clock if the comparison is false.

A method for communication between devices on a single wire interface is disclosed including: in a receiver coupled to the single wire interface, performing: detecting a signal transition indicating a sync start symbol on the single wire interface; while counting a number of internal clock cycles that corresponds to a duration of the sync start symbol, detecting a second signal transition on the single wire interface, indicating an end of the sync start symbol, a total number of internal clock cycles counted defining a bit time period; counting a number of internal clock cycles that correspond to half the bit time period, and then sampling a signal level at the single wire interface; determining the presence of a sync valid symbol at the single wire interface by testing the sampled signal level; and responsive to the determining the sync valid symbol is present, subsequently receiving serial bits corresponding to bits of a data word by sampling the signal level of the single wire interface at half the bit period for each one of the respective bits of the data word.

In yet another alternative arrangement, the method above further comprises: for a plurality of subsequent data words, for each of the data words, detecting another signal transition indicating a sync start symbol on the single wire interface; while counting a number of internal clock cycles that corresponds to a duration of the sync start symbol, detecting a second signal transition on the single wire interface indicating an end of the sync start symbol, the number of internal clock cycles counted defining a current bit time period; subsequently, determining the presence of a sync valid symbol at the single wire interface by counting a number of internal clock cycles that correspond to half the current bit period, and then sampling a signal level of the single wire interface; subsequently receiving serial bits corresponding to another data word by sampling the signal level of the single wire interface at half the current bit period for each one of the bits of the data word; and repeating the above four steps for each remaining data word in the plurality of subsequent data words.

In a further aspect of the present application, the method includes wherein detecting a signal transition indicating a sync start symbol further comprises detecting a transition from a high voltage level to a low voltage level on the single wire interface. In still a further alternative, the method further includes detecting a valid stop bit symbol comprising detecting a high voltage level on the single wire interface at a time corresponding to a half bit time period after a last bit of the data word is received. In still another arrangement, the method is further comprising: in a transmitter, for each data word to be transmitted, performing: transmitting a sync start symbol by transitioning a voltage level on the single wire interface to a first predefined voltage level for a bit time period defined by counting a predetermined number of internal clock cycles; subsequently, transmitting a sync valid symbol by transitioning the voltage level on the single wire interface to a second predefined voltage level for a time corresponding to the bit time period; transmitting the first bit of a data word on the single wire interface for a time corresponding to the bit time period; and for each successive bit of the data word, transmitting a voltage corresponding to a current bit of the data word in series on the single wire interface for a time corresponding to the bit time period; and following transmission of a last bit in the data word, transmitting a valid stop bit symbol on the single wire interface by placing the single wire interface at the second predefined voltage for the bit period.

In another aspect of the present application, checking for a conflict on the single wire interface by performing: transmitting a sync start symbol by transitioning a voltage level on the single wire interface to a first predefined voltage level for a bit time period defined by counting a predetermined number of internal clock cycles; subsequently transmitting a sync valid symbol by transitioning the voltage level on the single wire interface to a second predefined voltage level for a time corresponding to the bit time period; transmitting the first bit of a data word on the single wire interface for a time corresponding to the bit time period; for each successive bit of the data word, transmitting a voltage corresponding to a current bit of the data word in series on the single wire interface for a time corresponding to the bit time period; and during transmission of each successive bit of the data word, in a conflict handler in the receiver, receiving data bits corresponding to the voltage on the single wire interface, and detecting when a conflict exists on the single wire interface by comparing the transmitted data bits to the received data bits, and resetting the transmitter and the receiver when a conflict is detected on the single wire interface.

In another aspect of the present application, in a stuck state monitor within a receiver, detecting a voltage level corresponding to a wait symbol on the single wire interface; counting a number of internal clock cycles that corresponds to the duration of the wait symbol, and if the duration of the wait symbol exceeds a predetermined maximum time indicating a stuck state on the single wire interface, resetting the transmitter and the receiver.

Previously, use of a single wire interface was sometimes considered inappropriate, because the reliability of the data transfer depended on precise timing or synchronization between devices, requiring separate clock or strobe signals to be sent with the data signals, thus requiring more than one wire. Recognition in the present application of solutions that provide robust communications on a single wire interface due to use of the novel protocol advantageously overcomes the problems and deficiencies of the prior art interfaces, without requiring additional wires, precise timing, expensive clock circuitry, and without degrading the data performance characteristics of the interface.

BRIEF DESCRIPTION OF THE DRAWINGS

For a more complete understanding of the illustrative embodiments described herein and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION

The making and using of example illustrative embodiments are discussed in detail below. It should be appreciated, however, that the embodiments provide many applicable inventive concepts that can be embodied in a wide variety of specific contexts. The specific embodiments discussed are merely illustrative of specific ways to make and use the various embodiments, and the examples described do not limit the scope of the specification, or the scope of the appended claims.

For example, when the term "coupled" is used herein to describe the relationships between elements, the term as used in the specification and the appended claims is to be interpreted broadly, and is not to be limited to "connected" or "directly connected" but instead the term "coupled" may include connections made with intervening elements, and additional elements and various connections may be used between any elements that are "coupled."

In the embodiments, novel solutions are provided for a single wire communications interface. In the embodiments, the single wire communications interface has no common clock between the devices, and no strobe or synchronous clocking is required. Each device is independently clocked, and a novel simple and robust asynchronous data transfer protocol is used to ensure valid data is received.

Figure 1:
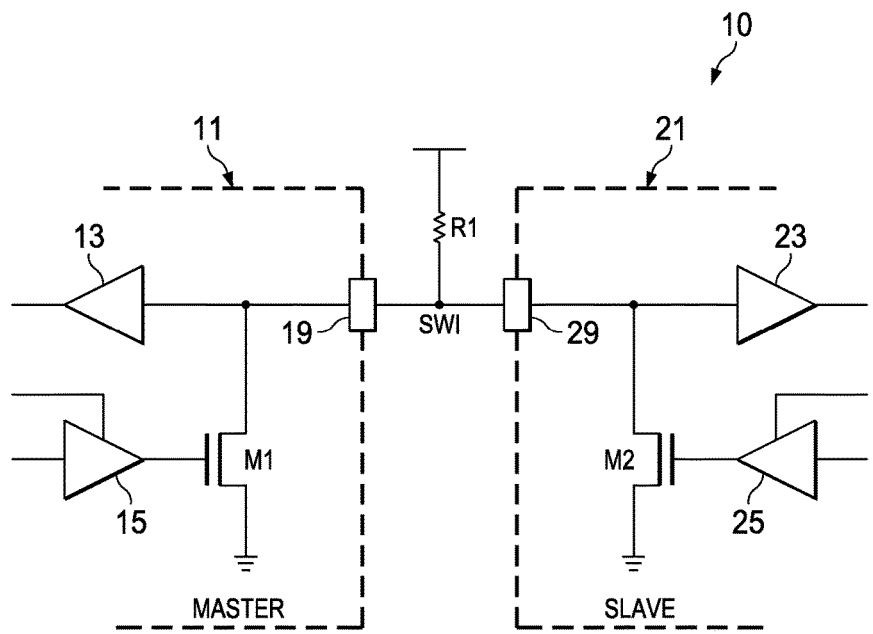
FIG. 1 illustrates in a simplified circuit diagram a portion of a master device and a slave device coupled using a single wire communications interface of the embodiments.

FIG. 1 depicts in a simplified circuit diagram a system 10 for use in illustrating the example embodiments. In FIG. 1, a single wire interface labeled SWI is shown connected to a master device (such as an integrated circuit, or a circuit board) 11 and to a slave device 21. In an example application, the slave device may be an integrated circuit under test or, a programmable integrated circuit with user programmable software stored within it, the single wire communications interface being used to assist in a software debugging operation. The slave device can also be a circuit board, card or system.

Continuing to describe FIG. 1, the master device 11 also includes a data receive buffer 13 and a data transmit buffer 15 which is coupled to a pull down transistor M1. The slave 21 similarly includes a data receive buffer 23 and a data transmit buffer 25, and a pull down transistor M2. The master device 11 has a single external connector 19 which may be an integrated circuit pin, ball or solder pillar, for example. Slave device 21 has a similar single pin or connector 29.

Data is transmitted in bit serial fashion on the single wire communications interface SWI. In the illustrated embodiment, the SWI is shown configured in an active pull down configuration. A pull up device, here shown as resistor R1, couples a positive supply voltage, such as 3.3 Volts, 2.0 Volts, or the like, to the single wire communications interface SWI. When no master or slave device is transmitting on the SWI, and it is in a wait state, the resistor R1 will pull the SWI up to a high voltage level that is near the positive supply voltage. Although a simple resistor R1 is shown in this example, other pull up devices such as diodes, transistors and the like can be used to form alternative embodiments. In FIG. 1, when a device is transmitting data or symbols on the SWI, if the data or symbol being transmitted corresponds to a low voltage level, the pull down device M1, or M2, will actively pull down the voltage on the SWI to a ground or to a low voltage that is near the ground potential. If the device that is transmitting data is, instead, transmitting a data bit that corresponds to a high voltage on the SWI, the pull down transistor M1, or M2, will be inactive and the voltage level on the SWI will again rise to the high voltage level (the positive supply minus any voltage drop due to the pull-up device, here R1). Thus for a wait state and also for an active transmission of a high voltage level corresponding to a data bit, the SWI will be pulled up to the high voltage level.

The choice of the voltage levels that correspond to a logical level in the integrated circuits is arbitrary, as is known to those skilled in the art. Either a logical "1" or a logical "0" can correspond to a high voltage level on the SWI, as it is an arbitrary assignment. For purposes of this description, however, a logical "1" data bit will correspond to a high voltage level on the SWI, while a logical "0" data bit will correspond to a low voltage level on the SWI. In alternative embodiments that are also contemplated herein, this correspondence may simply be reversed.

From examining FIG. 1, it is clear that the single wire communications interface supports only one transmitting device at a given time. That is, once a transmission by one device begins, the SWI will only operate correctly if no other device transmits until the first device stops transmitting. For an application where a master device (IC or circuit board) 11 is coupled to a slave device 21, the master device 11 knows the registers and data stores within the slave device 21 a priori, i.e. in advance, and so when an communication operation begins, the master device 11 knows how many data words the slave device 21 will expect to receive (for a write data operation) and how many data words the slave device 21 will transmit (for a read data operation). Because the communications is between devices where the operations are well defined, the single wire interface SWI can operate correctly without errors due to conflicts or clashing.

In the embodiments, no transmission begins from a slave device unless it is initiated by the master device. The master device 21 may be one of any number of different devices such as microcontrollers, microprocessors, digital signal processors, circuit boards, or cards. In a particular example embodiment, the master device 21 was implemented as a card coupled to a user's personal computer (PC) via a USB interface. The user can have an interface program running on the PC that includes a visual representation of the registers within the slave device, showing the data contained within the registers, for example. The master device can be an ASIC, FPGA or other CPLD device configured by the user to be a master for the SWI. The master can initiate a variety of transactions on the SWI using commands, such as a single register read, a multiple register read, a single register write, a multiple register write, and burst mode accesses are possible. Additional commands can be added to these such as reset, halt, run, step, and other commands. Commands can be added to enhance debug functionality, as the command field is, in the embodiments, the length of a data word so that in addition to read and write commands, additional commands can be defined to form additional embodiments.

The master device 11 and slave device 21 each include the buffers needed to transmit data bits and receive data bits on the SWI. The issue of the single wire interface timing also has to be addressed. Since the single wire communications interface SWI does not include a strobe or clock wire, the devices must have some way to exchange timing information. However, it is undesirable to require a precise timing circuit or other tightly defined synchronous timing regime, because the system would then be prone to errors if the two circuits were not successfully synchronized. Such systems are also prone to drift errors due to voltage and temperature and process variations, as is known.

Figure 2:
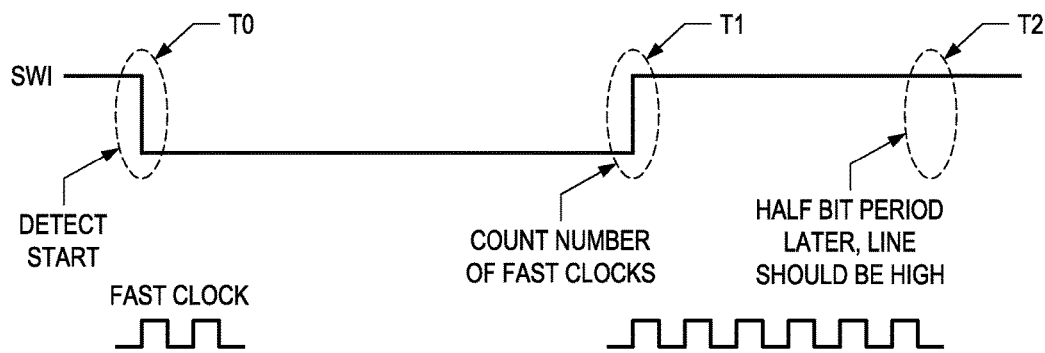
FIG. 2 illustrates in a timing diagram a novel sync pulse sequence used with the embodiments.

FIG. 2 illustrates the novel protocol advantageously provided by the embodiments for communicating data between the master and slave devices without the need for a strobe or clock line, and without using a precise timing regime. In FIG. 2, the beginning of a data transmission in the embodiments is illustrated in a timing diagram. At the beginning of the timing diagram, at the left hand side of FIG. 2, the SWI is in a wait state. At time T0, a "sync pulse" is placed on the SWI by a transmitting device that has data to transmit. The sync pulse symbol begins with a "Sync Start" symbol. The Sync Start symbol is defined to be a low voltage on the SWI for a time duration that defines a bit time period. The device that is transmitting data asserts the low voltage on the SWI while counting an internal fast clock. When the number of clock cycles counted reaches a predetermined value, the device that is transmitting the Sync Start symbol begins transmitting a "Sync Valid" symbol which is a high voltage on the SWI. This is shown at time T1 in FIG. 2.

The receiver detects the transition from the idle state to the Sync Start symbol simply by detecting the falling edge on the SWI at time T0. The receiver then begins counting clock cycles for an internal fast clock. The internal fast clock in the receiver is independent from and asynchronous to the internal fast clock used in the master, so the number of cycles counted in the receiver may be different from the number of internal clock cycles counted by the transmitter— but this is not important. In the receiver, the number of cycles is counted until the Sync Start symbol ends with a rising edge transition. This occurs at time T1 in FIG. 2, as the high voltage, corresponding to the Sync Valid symbol, is placed on the SWI.

The bit time period is now set to the duration that was defined by the low voltage duration of the Sync Start symbol. The receiver will now sample the voltage on the SWI at a time that is one-half the bit time period that was counted while the Sync Start symbol was on the SWI. The expected value at halfway through the Sync Valid symbol, or at one half the bit time period, is a high voltage, or a logical "1" value. If the receiver finds a logical "1" on the SWI at the half bit time period, the sync pulse sequence was valid, and the receiver knows to expect a data word (which can be a command word, if it is the first data word in a new transaction between the master and the slave, for example) to start in the next bit time period.

In the embodiment protocols, the master device clocks the bit time period using an internal fast clock within the master that is not known to the slave device, and is asynchronous to the slave device. Similarly, in this example, the slave device clocks the bit time period using its own internal fast clock and counter. The timing regimes in the two devices are independent. In order to make the communications reliable, in one example and non-limiting embodiment, a 16x clock is used. That is, although the clocks are not synchronized and no strobe or clock synching is done, a fast clock rate that is available to both devices is used. A desired SWI baud rate may be selected. A fast clock with a rate that is a multiple of the desired SWI baud rate, and associated clock counters, is provided for both the devices. The fast clock needs to be faster than the baud rate, and the faster the internal clock rate is, the more fast clock cycles there will be for a given bit time period, increasing reliability of the data transfers. The size of the counters can also be a factor, as the counters will need to be able to count the clock cycles that form a bit time period. A minimum bit time period is also determined. For the 16x fast clock example, a minimum bit time period of 8 clock cycles was chosen in one embodiment. Other values can be used for the minimum bit time period. The use of this minimum bit time period is intended to ensure that the receiver has sufficient time to count the bit time period, and to receive the data bits even if the receiver's internal fast clock is slower than the transmitter's fast clock. If the receiver's internal fast clock is faster than the transmitter fast clock, the two devices will have internal counts for the bit time period that are different, but since each device keeps an independent timing regime, there is still no problem with data exchange. A range of fast clock speeds, baud rates, and counter sizes can be used to form alternative embodiments that achieve the advantages of the single wire interface disclosed herein.

The sync pulse symbol consisting of the Sync Start and Sync Valid symbols is transmitted by the transmitting device for each data word that is transmitted on the SWI. The receiving device will count the bit time period for each Sync Start symbol and the receiver uses the new bit time period for the data word that follows the sync pulse symbol. So for every data word that is transmitted on the SWI, new timing information is exchanged between the transmitter and the receiver. Because the transmitter and the receiver are constantly exchanging timing information, the communications interface is highly robust and is not subject to errors due to drift, temperature, noise, and supply voltage sensitivity. Any change in the relative timing between the transmitter and the receiver is comprehended and adjusted in the next transmission; so that the receiver is always changing its bit time period to match the one used by the transmitting device.

Figure 3:
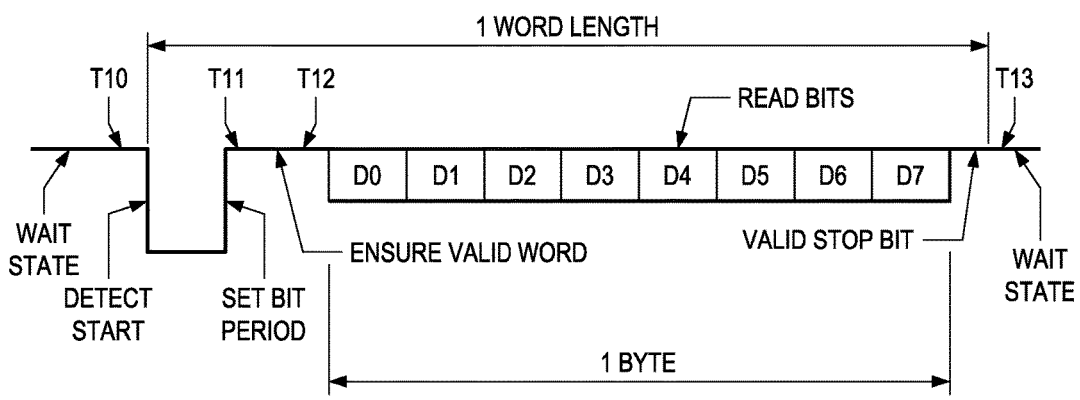
FIG. 3 illustrates in another timing diagram a single byte transfer on the single wire interface using example protocols of the embodiments.

FIG. 3 now illustrates in a timing diagram the transmission of a single data word on the SWI. In FIG. 3, the SWI begins in a Wait state before time T10. A sync pulse begins with a Sync Start symbol at time T10 indicated by a low voltage on the SWI that is transmitted for a time duration, the time duration defines the bit time period for the coming data word. In the embodiments illustrated here, a data word is equal to 8 bits that are serially transmitted on the SWI. For purposes of the description in this application, the standard "byte" definition of 8 bits, or two 4 bit nibbles, is used. However in alternative embodiments, shorter or longer data words could also be used. A key feature of the embodiments is that for each data word (which can be a command, an address, read data, or write data, or another type of information) a new sync pulse is transmitted. The embodiments thus ensure that the asynchronous single wire communications interface provides robust data transfers.

In FIG. 3, a Sync Valid symbol is shown beginning at time T11. The receiver checks the Sync Valid symbol at a point half way through the bit time period, shown at time T12. In the next 8 bit periods, data bits corresponding to a single data word are transmitted. The data bits are shown numbered D0, D1 . . . D7. Accordingly, the timing diagram in FIG. 3 illustrates 8 bit periods, one for each data bit, for transmitting the single byte.

FIG. 3 illustrates another feature of the embodiments. Following the last data bit of any data word; a Valid Stop Bit symbol is transmitted. The transmitter places a high voltage on the SWI. The receiver samples the Valid Stop Bit at halfway through the bit time period, shown at time T13 in the figure. If the voltage on the SWI is a high voltage at halfway through the bit time period, the receiver then records that the data word is valid.

In the embodiment protocol illustrated here, for each 8 bit or single byte data word that is transmitted, a total of eleven symbols are transmitted. As described above, a sync pulse which includes a Sync Start symbol and a subsequent Sync Valid symbol are transmitted before the first bit of the data word. A single byte is transmitted, which is eight bits. Following the last of the eight bits, a Valid Stop Bit symbol is transmitted. Thus a total of eleven bit periods are used for each data word. The embodiments provide a reliable communications interface due in part to the transmission of a new sync pulse, which defines the bit period, with each data word, so that the transmitter and the receiver are constantly adjusting the bit time period. In this manner, even though the internal clocks in the two devices are asynchronous and are not known to each other, and in spite of the face no strobe or clock wire is used, the timing of the data transmitter and the receiver is unexpectedly maintained.

In the example timing diagram of an embodiment shown in FIG. 3, a data word is shown as having eight bits, or a single byte. However, additional features may be added to form alternative embodiments. In one example, parity is added such as a single data parity bit. In this case, a total of twelve bit periods would be used for each data word. In other additional alternative embodiments, additional error checking and correction ("ECC") can be performed. For example, additional bits for ECC can be added to each data word. Additional embodiments are contemplated herein that are formed by adding either parity, or ECC, bits to the data words transmitted over the SWI. The protocols of the embodiments are easily extended to support these added features and the reliability and signal to noise ratio (SNR) can be increased by use of these techniques with the single wire interface.

As an additional alternative embodiment, the communication reliability of the SWI can be still further increased by using a received data checking scheme that includes voting. In this embodiment, when receiving data from the receiver buffer coupled to the SWI, the receiving device takes not one sample, but instead takes an odd number of samples over several internal clock cycles. In an example embodiment, three data samples are taken, with the middle sample right at the half bit time period, and one taken just before, and one taken just after. The receiver circuitry then compares the three samples, and if one of the samples differs from the other two, it is discarded and the logical value of the other two samples is used. This voting scheme makes the single wire communications interface more noise tolerant, as a single bad bit does not result in an error in received data. Further the presence of some noise in the system does not result in loss of reliable data transfer; instead the voting scheme makes it possible to reliably transfer data in spite of the presence of noise.

Figure 4:
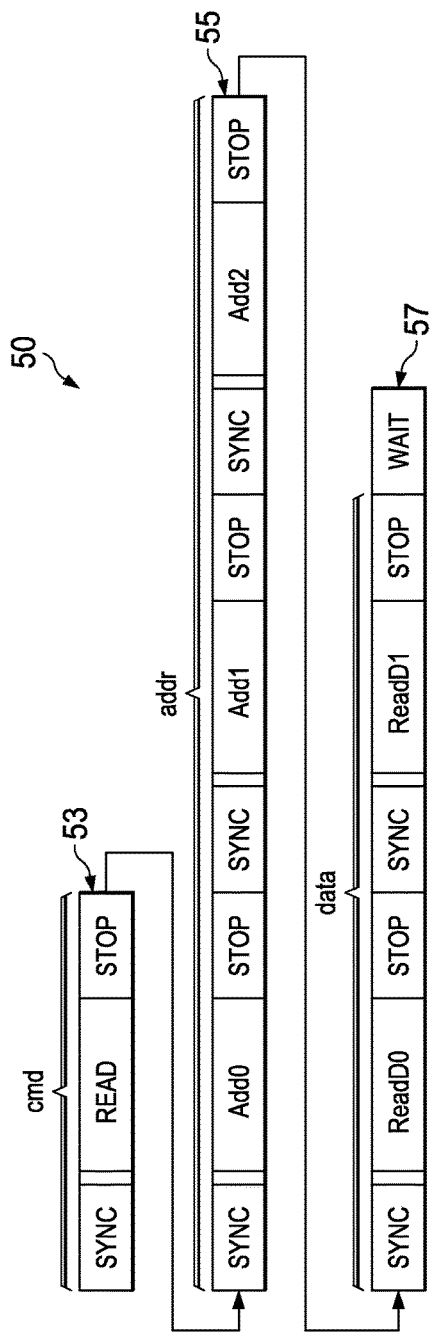
FIG. 4 illustrates in a simplified sequence diagram a read sequence using the single wire interface and the protocols of the embodiments.

FIG. 4 illustrates the symbols and data words seen on the single wire interface SWI during a read register sequence. In the embodiments, the SWI protocol has a single master device. Every transaction is initiated by the single bus master. In this manner reliable data transactions are further ensured.

Each transaction begins with a command. In the example embodiment, the command is a single data word of 8 bits. Using simple decoding, the 8 bit command word can uniquely identify up to 256 different commands. For simplicity of this illustration, 4 illustrative and non-limiting commands are described. A single register read is illustrated in FIG. 4. In addition, in the embodiments described in detail herein, additional commands are provided for a single register write, a multiple register read, and a multiple register write. Additional embodiments contemplated herein include adding commands for debugging and test such as run, halt, and step, commands used to control a processor for checking new software and firmware, for example. Using the write register commands, a user can set up the internal values of the registers of the slave device under test, and then allow the device under test to run for some number of clock cycles, and then halt the device and inspect the state of the internal registers. In this manner problems with software and firmware settings can be identified and the software and firmware may be debugged.

In FIG. 4, the master device initiates a read sequence by transmitting a read command sequence, 53. The first symbol for each data word is the sync pulse which consists of the Sync Start symbol and the Sync Valid symbol as are shown above. The receiver counts the internal clock cycles during the sync pulse start symbol as described above, and sets the bit time period for the next data word. In FIG. 4, for sequence 53 the data word is a "read" command word. As for every data word, the command data word ends in a Valid Stop symbol as shown in FIG. 4.

In FIG. 4, in sequence 55, the master device next transmits an address for the register read command. The registers within the slave device are known to the master device and are assigned addresses. In this example embodiment, three data words, or 24 total bits, are used for the address field. The three data words are labeled Add0, Add1, and Add2. In alternative embodiments, the address field could be longer, or shorter, depending on the particular configuration of the slave device. For each of the three data words of the address field in FIG. 4, the master transmits a sync pulse which consists of the Sync Start symbol and the Sync Valid symbol as described above. As described further below, the address field can be used to address a selected one of a plurality of slave devices, in alternative embodiments where several slave devices are coupled to the single wire interface.

FIG. 4 continues with the read data being transmitted. Unlike the command and address sequences, the data word sequence is transmitted from the slave device, to the master device. Thus the master must wait for the slave device and the master is now the receiving device. Following the address sequence 55, the master device cedes the SWI to the slave device for the data transmission from the slave.

In FIG. 4, each data word of the addressed register, here two bytes, is shown being serially transmitted on the SWI to the master device in sequence 57. The first data word, ReadD0, consists of 8 bits. The second data word, ReadD1, also consists of 8 bits. The receiver begins the transmission of each 8 bit data word with the sync pulse which as described above consists of a Sync Start symbol followed by the Sync Valid symbol. When the slave device is transmitting read data on the SWI, the master is acting as the receiver. In the protocol of the embodiments, the slave uses the bit time period set by the master in the last address field transmission for supplying the read data. The master device now counts the internal clock cycles that correspond to the half bit time period, and the master samples the SWI during that period. The master samples the state of the SWI at one half of each bit time period. In an alternative embodiment, the receiver circuitry within the master can use the data voting scheme in the protocols as described above.

The remaining sequences (single register write, multiple register read, multiple register write) described herein as examples operate in a manner that is similar to the single register read shown in FIG. 4. In each sequence, the master device initiates the transaction. In order to avoid conflicts on the single wire interface, only the master device can initiate a transaction. In the embodiments, the slave device cannot initiate a transaction and the slave device only transmits data words after receiving a read command.

Figure 5:
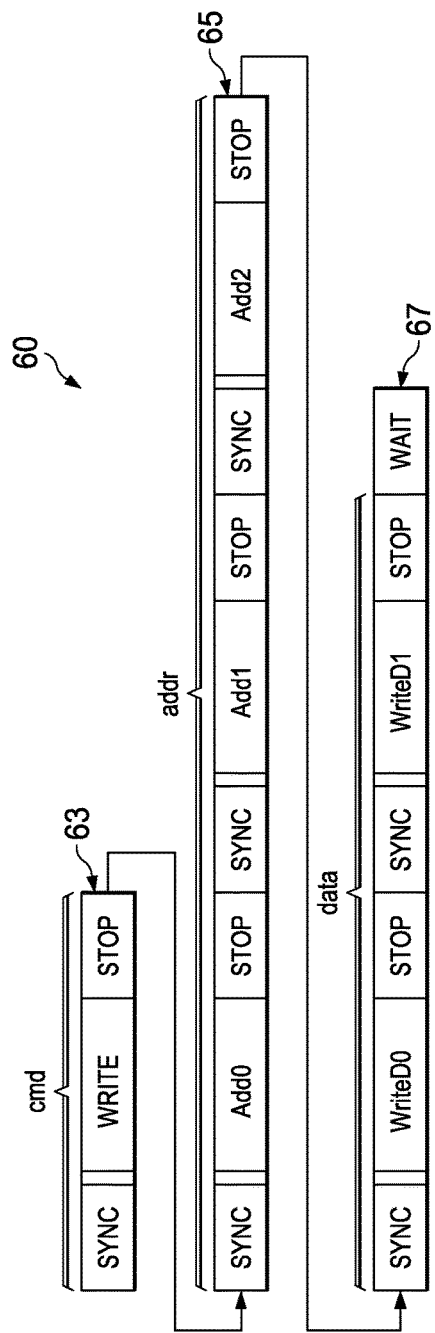
FIG. 5 illustrates in a simplified sequence diagram a write sequence using the single wire interface and the protocols of the embodiments.

FIG. 5 illustrates in another illustrative timing diagram a single register write sequence 60. In FIG. 5, the master device initiates the sequence by transmitting a command WRITE data command sequence 63. As described above, the master first sends a sync pulse with a Sync Start symbol defining the bit time period, and the Sync Valid symbol. The slave device, the receiver, counts the number of internal clock cycles that the SWI is at a low voltage, thus determining the bit time period set by the master device. The slave then receives the command as an 8 bit data word, which is decoded and interpreted by the slave device. The Valid Stop Bit symbol ends the command data word, as for all data words transmitted on the SWI.

The single register write sequence continues with the master device transmitting an address sequence 65. The address data words Addr0, Addr1, Addr2, are transmitted and each one consists of 8 bits of serial data. The address indicates which register in the slave device is being written to.

The single register write command continues in FIG. 5 with the write data bytes. The master device transmits data word WriteD0, and then transmits data WriteD1, each data word consisting of a sync pulse symbol including a Sync Start symbol followed by a Sync Valid symbol, then 8 serial data bits, and then the Valid Stop Bit symbol. As the bit time period is transmitted with each data word, the slave receives a new bit time period for each one and thus the timing between the devices is constantly refreshed. Thus, as an advantage that accrues by use of the embodiments, even though the master device and the slave device operate asynchronously and have independent timing regimes unknown to one another, the use of the novel protocols of the embodiments nonetheless provide reliable data exchanges between the devices on the single wire communications interface.

Figure 6:
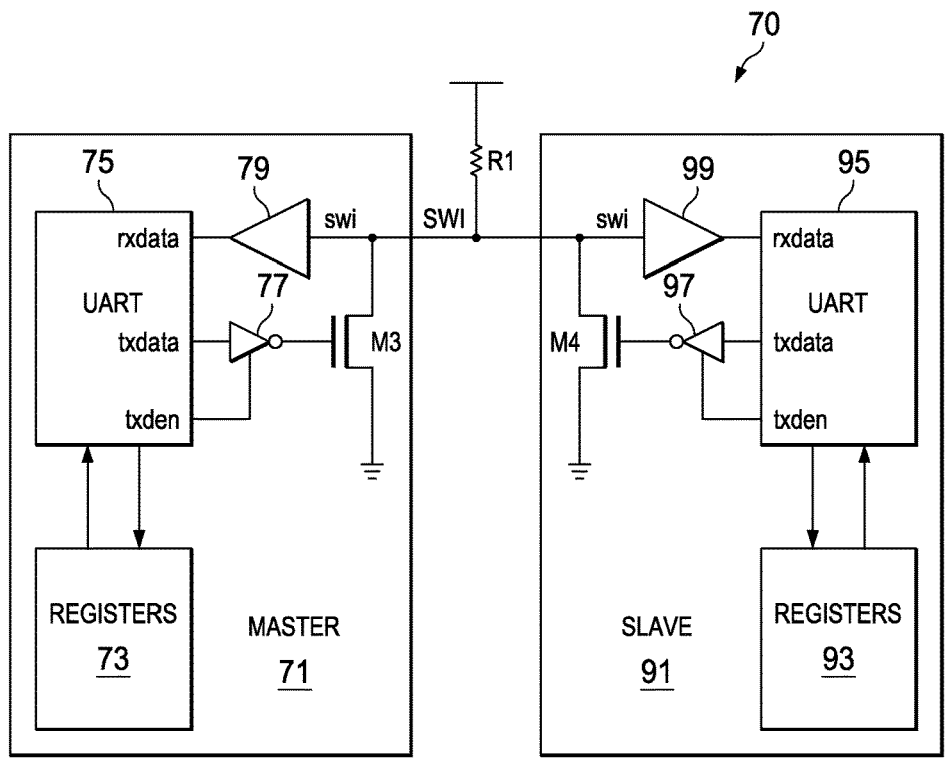
FIG. 6 illustrates in another circuit diagram a master and a slave integrated circuit showing further details of the embodiments.

FIG. 6 illustrates in a circuit diagram 70 an illustration of some internal circuitry for a master integrated circuit 71 and a slave integrated circuit 91 for use with the embodiments. In FIG. 6, each of the devices 71, 91 has a single input/output pin "swi" for the single wire interface SWI. The master device 71 has a receive data input buffer 79 that outputs serial received data labeled "rxdata" to a universal asynchronous receive transmit function, or "UART" 75. The transmit buffer 77 is coupled to receive transmit serial data "txdata" from the UART 75 and is coupled to an active pull down transistor M3. A transmit enable signal "txden" controls the buffer 77 and determines when the data buffer 77 can drive the transistor M3 so as to pull down the interface SWI.

In the illustrative embodiment, transistor M3 can be an N-type MOSFET transistor, for example. In alternative embodiments, other transistor types may be used. When the transmit data bit on txdata is a "0", the transmit data buffer 77 will invert the data to a "1", as shown by the bubble symbol on the transmit data buffer 77, and thus cause transistor M3 to turn on and pull down the voltage on the SWI. Thus the logical "0" on the output txdata results in a low voltage on the single wire interface SWI. When the serial data to be transmitted txdata is a "1", the inverter 77 will put out a logical "0" or low voltage. In this case, transistor M3 will be inactive and the single wire interface SWI will be pulled up by resistor R1.

In FIG. 6, the slave device 91 also has a UART circuit 95, receiver buffer 99 and the transmit buffer 97, and transistor M4, which all operate in the same manner as the corresponding circuitry for the master device 91. The registers 73 and 93 in both the master device 71 and the slave device 91 provide parallel data words to be transmitted by the UART devices 75, 95 and can receive parallel data words from the UART devices 75, 95.

Figure 7:
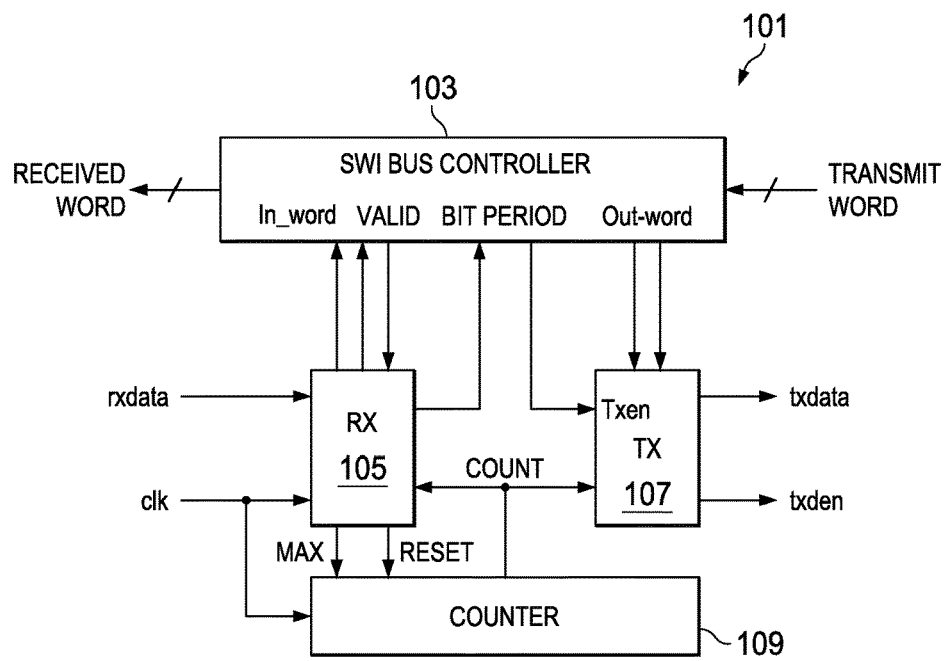
FIG. 7 illustrates in a simplified circuit diagram a UART circuit for use with the single wire interface of the embodiments.

FIG. 7 illustrates in a circuit diagram an example circuit implementation for a UART circuit 101 for use with the embodiments. The UART circuit of FIG. 7 may be, for example, used to implement a slave or master device UART as shown in FIG. 6. In FIG. 7, UART 101 includes an SWI bus controller 103, which may be implemented as a state machine or other controller circuit, a receiver RX 105, a transmitter TX 107, and a counter 109. The counter and the receiver each receive a clock input "clk" from an internal clock. The internal clock for the UART can be, for example, chosen to be at least 16 times a selected baud rate for the SWI. The receiver RX 105 receives the serial data rxdata from the receive buffer. The transmitter TX 107 outputs a serial transmit data txdata and a transmit data enable txden to the transmit buffer. The UART 101 also acts as a serial input parallel output ("SIPO") receiver device for the circuit by receiving serial data bits, and outputting parallel data words on the "received word" output. The UART 101 acts as a parallel input serial output ("PISO") device with respect to the circuit by receiving parallel data words as the transmit word, and outputting serial data bits for transmission on the txdata output. Thus the UART can convert serial received data to parallel data for the receive function, and can convert parallel transmit data to serial data for the transmit function.

The SWI Bus Controller 103 also detects a sync pulse symbol by observing the falling edge that indicates a Sync Start symbol, as described above, and by confirming a Sync Valid symbol that follows it. The counter 109 is operated to count the bit period as described above, and the SWI Bus Controller receives that input from the RX 105, thus implementing the protocols for the sync and timing as described above.

Figures 8, 10:
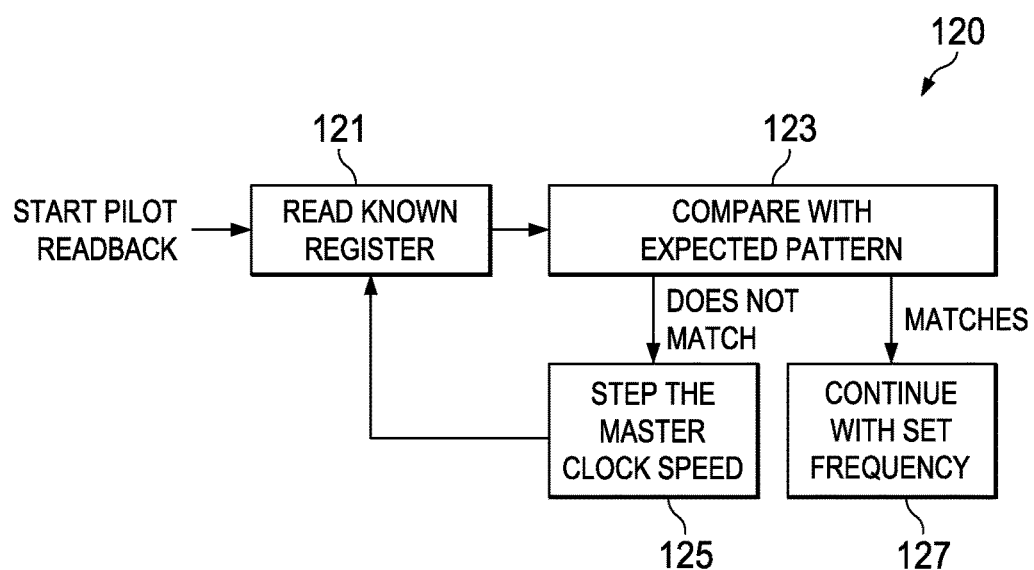
FIG. 8 illustrates a set of commands for use with the single wire interface of the embodiments.
FIG. 10 illustrates in a circuit diagram for a conflict handling circuit for use with additional embodiments of the single wire interface.

FIG. 8 illustrates the command coding for an illustrative embodiment of the SWI protocols that includes a single register read, multiple register read, single register write, and multiple register write command. As shown in FIG. 8, only two bits of the 8 bit command word are used for four commands. The command field can support up to 256 unique commands, so the protocols can be easily expanded to include other desired commands to form additional alternative embodiments.

Figure 9A:
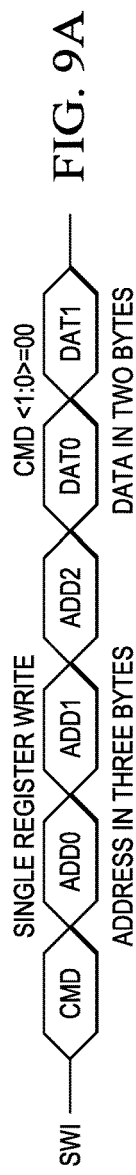
FIGS. 9A-D illustrate in simplified timing diagrams the timing for certain communications sequences using the single wire interface of the embodiments.
Figure 9B:
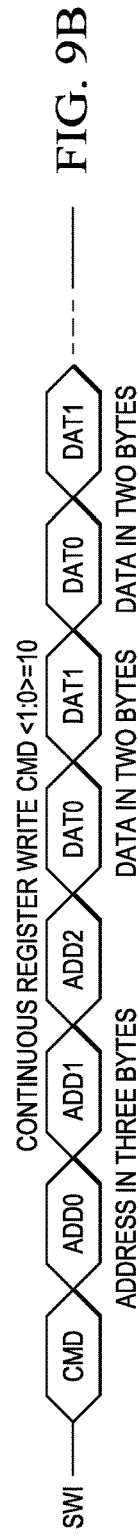

FIGS. 9A-9D illustrate in simplified timing diagrams the sequences on the SWI that correspond to the four example and illustrative commands in FIG. 8. In FIG. 9A, the single register write command is depicted. Each data word bit period is shown, however for simplicity the sync start symbol, sync valid symbol and stop bit symbols are omitted. Each data word shown includes all three of these symbols and so each data word shown, whether it is a command, address or data item, includes the Sync Start, Sync Valid, and Valid Stop Bit symbols as described above. In FIG. 9A, a single register write command, corresponding to the timing diagram of FIG. 5, is illustrated. In FIG. 9B, a continuous register write is depicted. In this burst write mode, the master initiates the transaction by transmitting the command "10" in this illustrative embodiment, although other command encoding schemes can be used to form alternative embodiments. The three bytes of address follow the continuous register write command. As the master device knows the number of words that the register located at the register address includes in the slave device, the master then transmits the correct number of words in sequence, each data word consisting of 8 serial data bits transmitted on the SWI as described above. After the last word is transmitted by the master, the master allows the bus to return to a wait condition. To avoid conflicts on the single wire bus, the master is the only device that can initiate a new transaction, thus the slave device can only wait for the next command following completion of a command sequence, and the slave will not transmit anything until requested to do so by a valid read command.

Figure 9C:
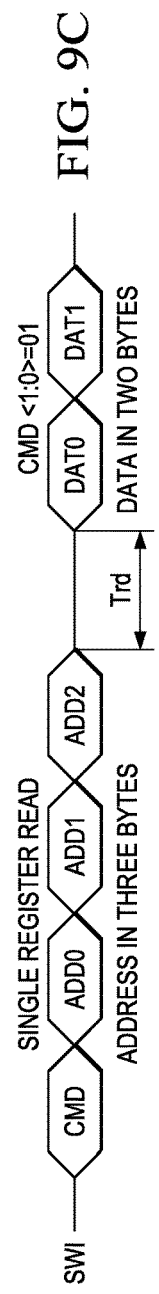
Figure 9D:
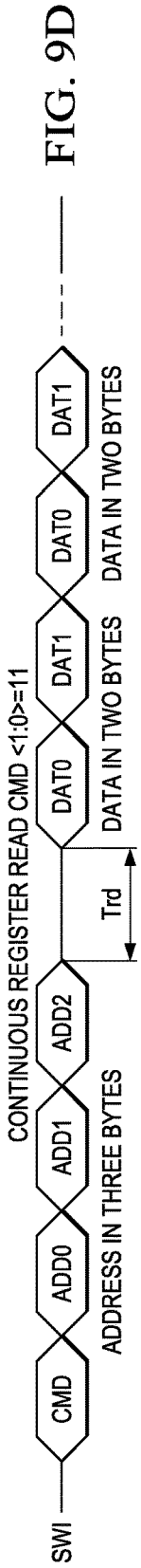

FIG. 9C depicts the data words that correspond to a single register read, a command that corresponds to the timing diagram of FIG. 4, above. FIG. 9D depicts a continuous register read sequence, with a command shown as "11". In the read sequences, after the master transmits the three address fields, the master will cede the SWI to the slave device. After a delay time "Trd", the slave begins to transmit data words. The bit time period used by the slave device to transmit read data words will be the last bit time period sent by the master device, e.g., the bit time period used to transmit address Add2 in the sequence shown in FIG. 9D. For a continuous register read, the master will expect the slave to send all of the data words stored in the slave register being addressed, and since the master device knows the number of words to expect, there is no acknowledge or any other information sent by the slave device. When the slave device has finished transmitting the last data word in the burst in FIG. 9D, the SWI will return to a wait state until the master device initiates a new transaction.

In order to further ensure reliable data exchanges, the master device may determine an optimum clock frequency for addressing a particular slave device. In an additional alternative embodiment, a pilot read sequence is used to determine whether a given clock frequency in the master device provides an appropriate bit time period. In this embodiment, the master device may read a register in the slave device that has a known value, or "pilot" register. In a pilot readback sequence, the master device may attempt to read the pilot register using a short bit time period (fast data rate) as an initial setting. If that read results in a return of good data which matches the known value, then the master can continue to use that clock frequency and that bit time period. However, if the read is unsuccessful, then the master will step down the data rate until the data read is successful.

FIG. 10 depicts in a state diagram an illustrative example of a protocol 120 for performing the pilot readback sequence in a master device. In FIG. 10, a "Start Pilot Readback" sequence begins by entering state 121, "Read Known Register". In this state, the master sends a single read register command to the slave with an address of a register that contains a known value, such as a hardwired register, which may be implemented using resistors, fuses or anti-fuses, or a non-volatile register that is programmed to a known value in the slave device. The pilot register may contain a device ID number or other identity code indicating what type of device the slave device is, for example.

In state 123, the results of the read register command are compared with an expected data pattern, and depending on the outcome of the compare, the read pilot sequence transitions to state 125, where there is not a compare match. The master device then steps the clock frequency and returns to the state 121, "Read Known Register" and the method continues. If on the other hand the data received matches an expected data pattern, the master has found a successful clock frequency that works well with the slave device. The master device then enters state 127 and the operations continue.

Note that in the read pilot sequence as described above, the data rate can be adjusted by increasing or decreasing the clock frequency of a clock circuit in the master device. In an alternative embodiment, the bit time period can be adjusted by increasing the number of clock cycles that are counted by the master when transmitting the Sync Start symbol as described above. In either approach the slave device will have more time to respond to the read request, and the master can continue to decrease the clock rate, or increase the count to extend the bit time period, until the pilot readback sequence as shown in FIG. 10 results in a successful read of the pilot register in the slave device.

Additional features that are contemplated herein may be added to the embodiments described above to create additional alternative embodiments. For example, in FIG. 11, two different reliability features are shown.

Figure 11:
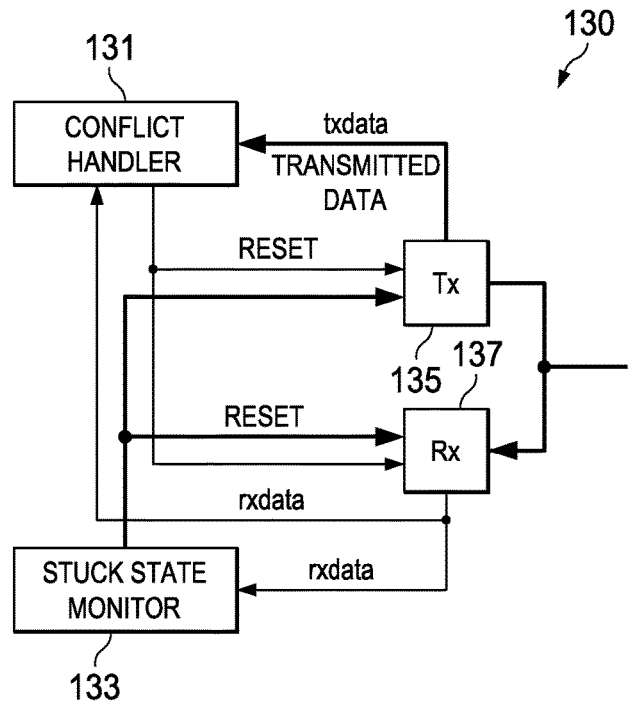
FIG. 11 illustrates in a state diagram an alternative embodiment that provides additional features.

In FIG. 11, a system 130 for managing the state of the single wire communications interface SWI described above is shown in a simplified block diagram. System 130 includes two additional functional blocks 131 and 133. In an embodiment, the system includes both the conflict handler 131 and the stuck state monitor 133 as shown. However, in additional alternative embodiments, the system 130 may include only one of these functional blocks, which operate independently of one another. In an additional embodiment, as described above, neither of these functional blocks is used.

The Conflict Handler 131 is configured to detect a data collision on the SWI and to act to correct it by resetting the transmitter circuitry and the receiver circuitry in the device. If the device is transmitting data using the transmitter in the device UART as described above, the Conflict Handler 131 is coupled to both the outgoing serial transmit data 'txdata', and to the received input serial data 'rxdata'. When the SWI is operating correctly and there is no conflict, the serial data input by the receiver 'rxdata' will match the transmitted serial data output by the transmitter, 'txdata'. However, if another device is also driving the SWI at the same instant in time, the transmit data will not match the received data, and so the data conflict can be detected. In that case the conflict hander 131 will reset both the transmitter 135 and receiver 137 in the device UART and an error can be reported to the device.

Another possible error that can occur on the single wire interface is a "stuck state". Stuck State monitor 133 is provided to address this problem by monitoring the serial received data 'rxdata'. If the SWI remains at a low voltage for an unexpected long period of time, the transmitter of a device coupled to the SWI may be stuck while transmitting. Similarly, if the SWI remains at a high voltage for an extraordinarily long period of time, the master device or the slave device that is currently the transmitter may be stuck. By counting the number of clocks that the SWI voltage has the same value, and determining when a maximum number is exceeded, the Stuck State monitor 133 can detect these conditions, and when it does detect these conditions, the transmitter and the receiver in the device UART circuit can be reset by the Stuck State monitor 133.

Neither the Stuck State monitor 133 nor the Conflict Handler 131 described here is required for the protocols and circuits described above to operate correctly. The use of these embodiments with the embodiments described above forms additional novel embodiments with additional advantages. An SWI obtained with these additional functions is even more reliable and robust. Devices that are provided both with and without these features are contemplated as novel embodiments and are within the scope of the claims of this application.

Figure 12:
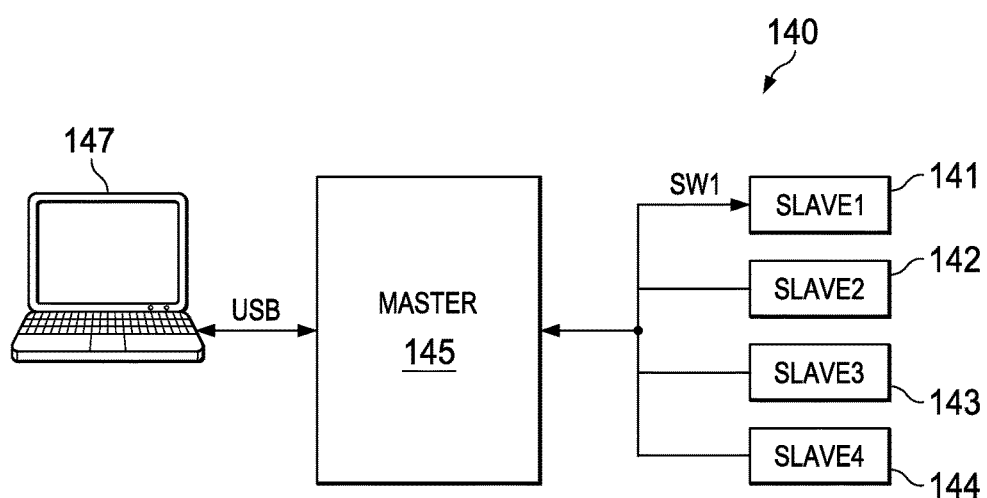
FIG. 12 illustrates in a system block diagram a user computer interfacing with a master device that is further coupled to several slave devices using the single wire interface of the embodiments.

FIG. 12 depicts a system embodiment 140 with a single master device 145 coupled to multiple slave devices 141, 142, 143, 144 using a simple star configuration. Note that in this embodiment, the master device 145 is coupled to a single wire interface SW1. The master device 145 may be a circuit board, card or system that is configured to communicate to a user computer using, for example, a USB bus connection. The user computer may 147 include a software suite that is arranged to visually depict the contents or internal status of one or more slave devices in a system under test or configured for software debugging. The USB interface allows the user computer to send commands and data to the master device 145 for communication to the slave devices 141, 142, 143, 144. Each slave is coupled to a single wire interface SW1 and is directly coupled with the master so that, as explained above, there is only one master device on the single wire interface SW1. As described above, the master is the only device that can initiate a transaction on the SWI, so the slave devices 141, 142, 143, 144 can only transmit data in response to a valid read command from the master device using the embodiment protocols. Since the address field includes three data words, each slave device can be individually addressed. The master device 145 knows the addressable registers and data stores within each slave device and so the master device 145 can address each register for read and write commands individually. Since the only transmission the slave devices 141-144 can make is in response to a read command that is first initiated by the master device 145, no conflicts occur.

As an alternative embodiment, the master device 145 could be coupled to each slave device 141, 142, 143, 144 on a dedicated single wire interface. In this configuration, only one slave device is coupled on each single wire interface, and the master device 145 would have multiple SWI pins. The operations of the single wire interface in this simpler configuration are as described above.

Using the embodiments in the system of FIG. 12, a user may test a new slave device such as a camera, cell phone, music player, computer, controller etc. The user may develop new or improved software and firmware for a new or an existing system or device using the master device 145 and the SWI protocols of the embodiments. When the slave devices are finally released to production, only a single wire external connection is devoted to the SWI, so that the remaining resources such as system pins and traces are available for additional product features.

Although the example embodiments have been described in detail, it should be understood that various changes, substitutions and alterations can be made herein without departing from the spirit and scope of the application as defined by the appended claims.

Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding embodiments described herein may be utilized according to the embodiments and alternative embodiments. Accordingly, the appended claims are intended to include within their scope such processes, machines, manufacture, compositions of matter, means, methods, or steps.

What is claimed is:

1. A method for communication on a single wire interface, comprising:
    receiving, at a receiver coupled to the single wire interface, a sync signal via the single wire interface;
    detecting a first signal transition from a first voltage level to a second voltage level of the sync signal, the first signal transition indicating a beginning of a sync pulse of the sync signal;
    detecting a second signal transition from the second voltage level to the first voltage level of the sync signal, the second signal transition indicating an end of the sync pulse of the sync signal;
    determining whether the sync signal is valid by checking a signal level of the sync signal at a time later than the second signal transition; and
    responsive to the determining the sync signal is valid, receiving data via the single wire interface.

2. The method of claim 1 further comprising:
    determining a pulse width of the sync pulse of the sync signal by calculating a time period between the first signal transition and the second signal transition; and
    receiving bits of data with each data bit being one pulse width wide.

3. The method of claim 2, in which the calculating a time period between the first signal transition and the second signal transition includes counting a number of cycles of a clock signal internal to the receiver.

4. The method of claim 2, in which the checking a signal level of the sync signal includes checking at a time that is half that of the pulse width.

5. A method for communication on a single wire interface, comprising:
    transmitting, at a transmitter coupled to the single wire interface, a sync signal via the single wire interface with a first signal transition from a first voltage level to a second voltage level, the first signal transition indicating a beginning of a sync pulse of the sync signal,
    transmitting a second signal transition from the second voltage level to the first voltage level,
    maintaining the second voltage level for a time after the second signal transition to indicate a valid sync pulse; and
    transmitting data via the single wire interface after maintaining the second voltage level for the time after the second signal transition.

6. The method of claim 5 further comprising:
    determining a pulse width of the sync pulse of the sync signal by calculating a time period between the first signal transition and the second signal transition; and
    transmitting data bits after the second transition with each data bit being one pulse width wide.

7. The method of claim 6, in which calculating a time period between the first signal transition and the second signal transition includes counting a number of cycles of a clock signal internal to the transmitter.

8. The method of claim 6, in which the maintaining the second voltage level for a time after the second signal transition includes maintaining the second voltage for a time that is half that of the pulse width.

9. The method of claim 5 further comprising:
checking for a conflict for data transmitted via the single wire interface by:
receiving data values for one or more data bits corresponding to a receiver,
comparing the received data values of the receiver with corresponding data values stored in the transmitter, and
determining whether a conflict is detected on the single wire interface based on the comparison results.

10. The method of claim 9 further comprising:
resetting the transmitter and the receiver in response to a determination that a conflict is detected on the single wire interface.

11. The method of claim 5 further comprising:
checking for a stuck state condition of the single wire interface by:
monitoring a voltage level of a wait symbol transmitted via the single wire interface;
counting a number of cycles of a clock signal corresponding to a duration of the wait symbol at the voltage level,
determining the stuck state based on whether the duration of the wait symbol exceeds a threshold duration.

12. The method of claim 11 further comprising:
resetting the transmitter and the receiver in response to the determination of the stuck state of the single wire interface.

13. A device for a two-way one-wire communications system comprising:
the device being configurable as a master or a slave on a two-way communication system, comprising:
a receive buffer configured to receive a sync signal and data via a single wire interface; and
a controller configured to:
detect a first signal transition from a first voltage level to a second voltage level of the sync signal, the first signal transition indicating a beginning of a sync pulse of the sync signal,
detect a second signal transition from the second voltage level to the first voltage level of the sync signal, the second signal transition indicating an end of the sync pulse of the sync signal, and
determine whether the sync signal is valid by checking a signal level of the sync signal at a time later than the second signal transition, wherein the receive buffer is further configured to receive data in response to determining that the sync signal is valid.

14. The device of claim 13, wherein the controller is further configured to:
determine a pulse width of the sync pulse of the sync signal by calculating a time period between the first signal transition and the second signal transition; and
receive bits of data with each data bit being one pulse width wide.

15. The device of claim 14 further comprising:
a counter configured to calculate the time period by counting a number of cycles of a clock signal internal to the device.

16. The device of claim 14, including checking a signal level of the sync signal at a time that is half that of the pulse width.

17. The device of claim 13, wherein the receive buffer receives a sync signal along with each data word received via the single wire interface.

18. The device of claim 13 further comprising:
a transmit buffer configured to transmit data over the single wire interface, the transmit buffer coupled to a transistor, the transistor configured to pull down a voltage level corresponding to the signal wire interface to a reference voltage level.

* * * * *